United States Patent [19]
Török

[11] 3,995,203
[45] Nov. 30, 1976

[54] RELUCTANCE-TYPE ARRANGEMENT

[75] Inventor: Vilmos Török, Vasteras, Sweden

[73] Assignee: Allmanna Svenska Elektriska Aktiebolaget, Vasteras, Sweden

[22] Filed: Apr. 10, 1975

[21] Appl. No.: 567,015

[30] Foreign Application Priority Data
Apr. 19, 1974  Sweden ............................. 7405278

[52] U.S. Cl. ............................ 318/166; 318/225 R; 310/163
[51] Int. Cl.² ...................................... H02K 19/06
[58] Field of Search ............ 310/163, 198; 318/166, 318/225 R

[56] References Cited
UNITED STATES PATENTS

| | | | |
|---|---|---|---|
| 2,736,853 | 2/1956 | Selgin | 318/166 |
| 3,633,083 | 1/1972 | Teddoreson | 318/225 R |
| 3,679,953 | 7/1972 | Bedford | 318/166 |
| 3,697,840 | 10/1972 | Koch | 318/166 |
| 3,749,990 | 7/1973 | Harz | 318/166 |

Primary Examiner—Gene Z. Rubinson
Attorney, Agent, or Firm—Watson Cole Grindle & Watson

[57] ABSTRACT

A reluctance-type machine arrangement includes a stator with salient poles and a rotor with salient poles surrounded by the stator, the number of stator poles being twice as great as the number of rotor poles. The stator is provided with a working winding and a first magnetizing winding connected to a constant voltage source. Each of the windings includes a number of two-pole coils each of which surrounds two stator poles located immediately one after the other in a peripheral direction. The two-pole coils of the first magnetizing winding are displaced by a stator pole pitch with respect to the two-pole coils of the working winding. A second magnetizing winding is provided which drives the flux along the same flux path and with substantially the same distribution between the various flux paths as the flux driven by the first magnetizing winding. The second magnetizing winding is series-connected to at least a part of the working winding by controlled rectifiers. The arrangement is such that the polarity of the magnetomotive force of the second magnetizing winding is unaltered during varying polarities of the working winding.

6 Claims, 18 Drawing Figures

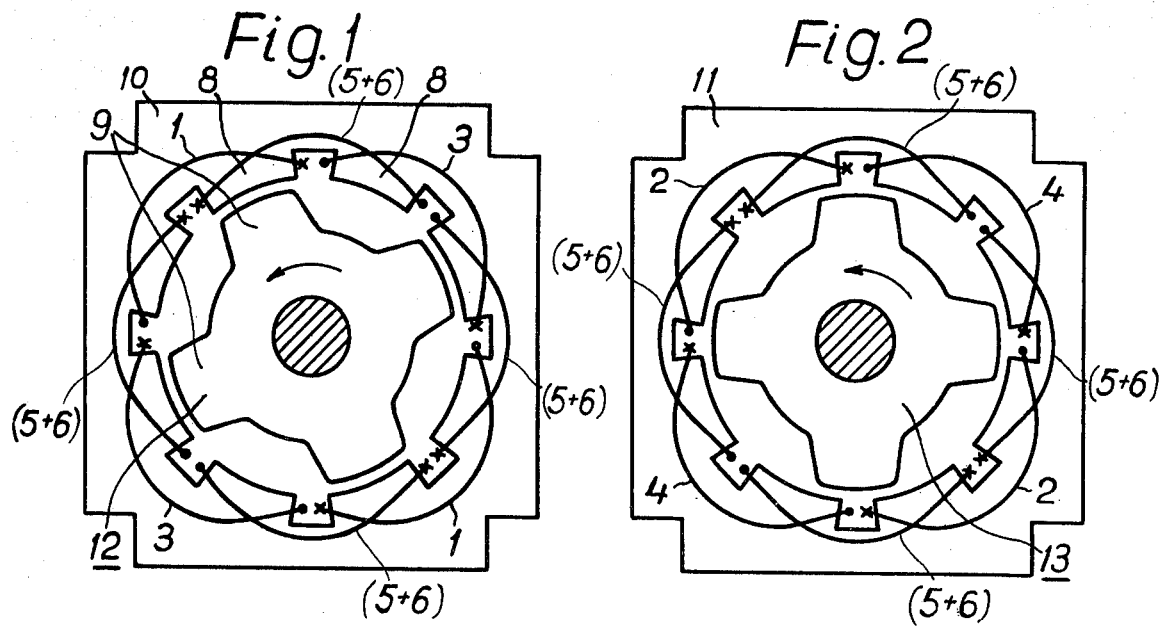
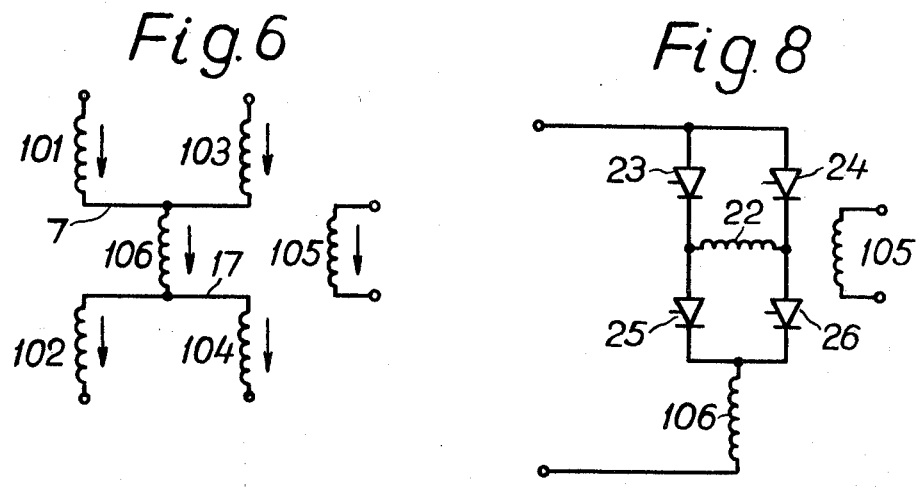
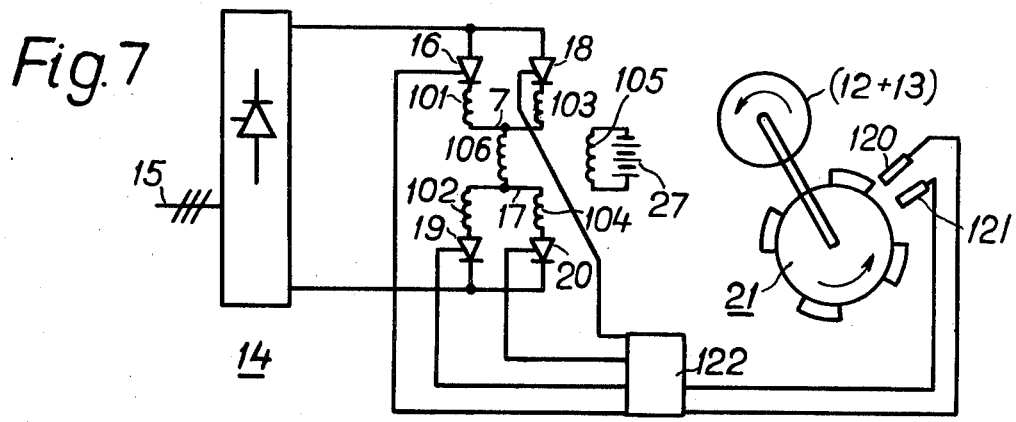

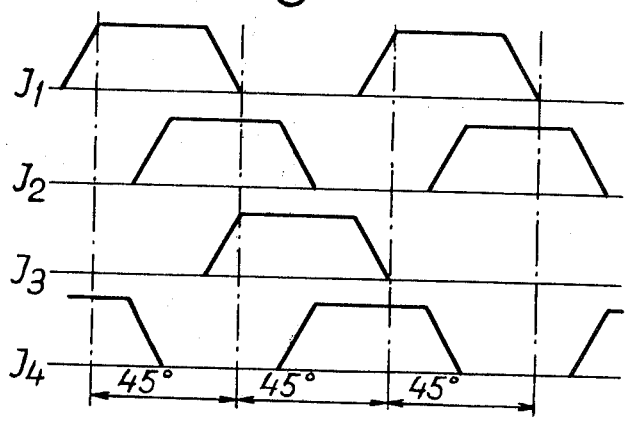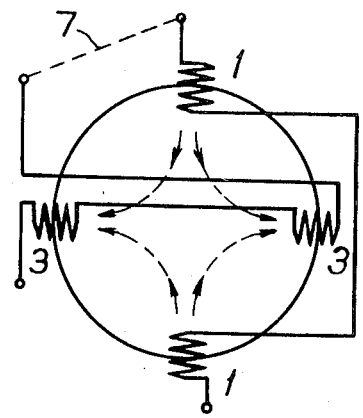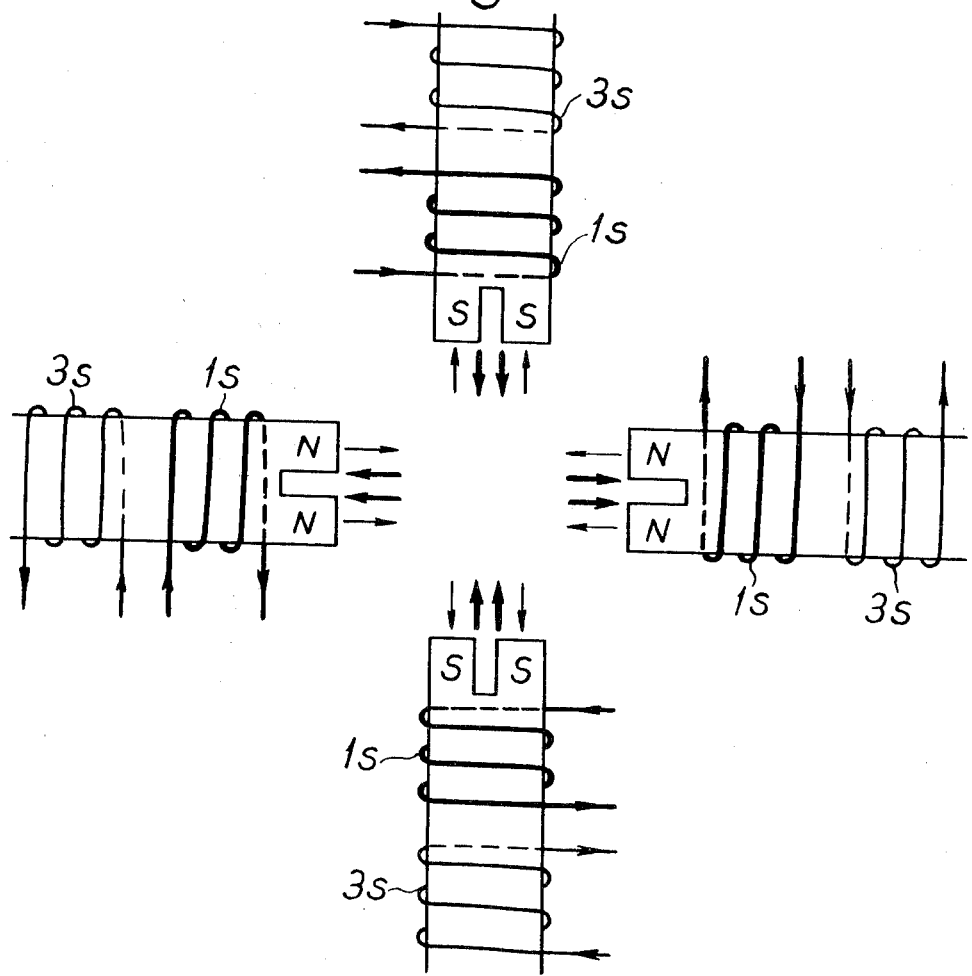

3,995,203

RELUCTANCE-TYPE ARRANGEMENT

BACKGROUND OF THE INVENTION

Field of the Invention

The present invention relates to a reluctance-type machine arrangement comprising a stator with salient poles and a rotor with salient poles surrounded by the stator, the number of stator poles being twice as great as the number of rotor poles, and the stator being provided with a working winding and a first magnetizing winding connected to a constant voltage source, each of the windings comprising a plurality of two-pole coils, each of which surrounds two stator poles positioned immediately one after the other in the peripheral direction, the two-pole coils of the first magnetizing winding being displaced with respect to the two-pole coils of the working winding.

SUMMARY OF THE INVENTION

By this invention the noise generation can be reduced to a relatively low value, while at the same time a high degree of utilization of the material is obtained.

The invention is characterised in that there is provided a second magnetizing winding for driving a flux along the same flux paths and with substantially the same distribution as the flux driven by the first magnetizing winding. The second magnetizing winding is series-connected to at least a part of the working winding through controlled rectifiers in such a way that the polarity of the magnetomotive force of the second magnetizing winding is unaltered with varying polarities of the working winding. The two ends of the working winding are connected to the same end of the second magnetizing winding by two controlled rectifiers and are connected to the same point in the DC working by two other controlled rectifiers. The two ends of the working winding are each connected to one output terminal of a controlled DC source each by a controlled rectifier, the controlled rectifiers being similarly oriented with respect to the output terminal; and the working winding has a center tap which is directly connected to the second magnetizing winding.

BRIEF DESCRIPTION OF THE DRAWINGS

The invention will be described in the following with reference to the accompanying schematic drawings, in which FIGS. 1 and 2 show a reluctance-type machine arrangement according to the invention in section along the lines I — I and II — II, respectively, of FIG. 3 which shows the same arrangement seen from above.

FIGS. 6, 7 and 8 show various ways of arranging the controlled rectifiers included in the arrangement according to the invention.

FIG. 14 shows the currents in the working windings as functions of time.

FIGS. 15 and 16 show how the various parts of the working winding are connected to each other.

DESCRIPTION OF THE PREFERRED EMBODIMENTS

Figure 3:
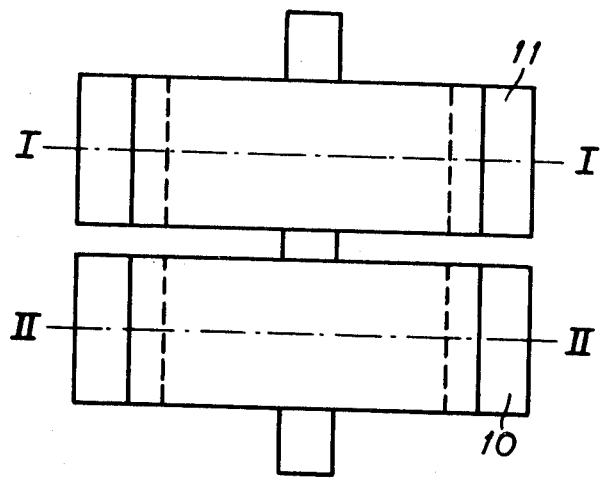
Figure 4:
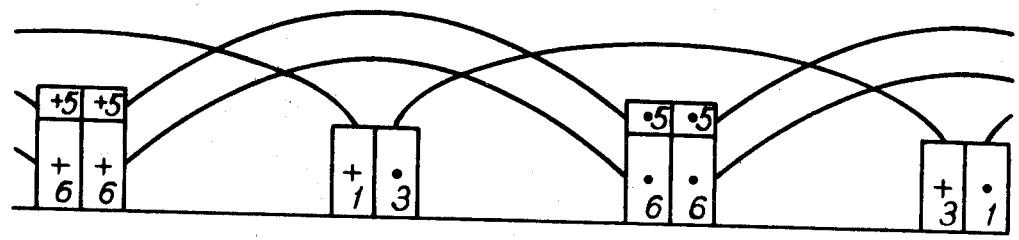
FIG. 4 shows a part of the stator core illustrated in FIG. 1 on an enlarged scale and extended.
Figure 5:
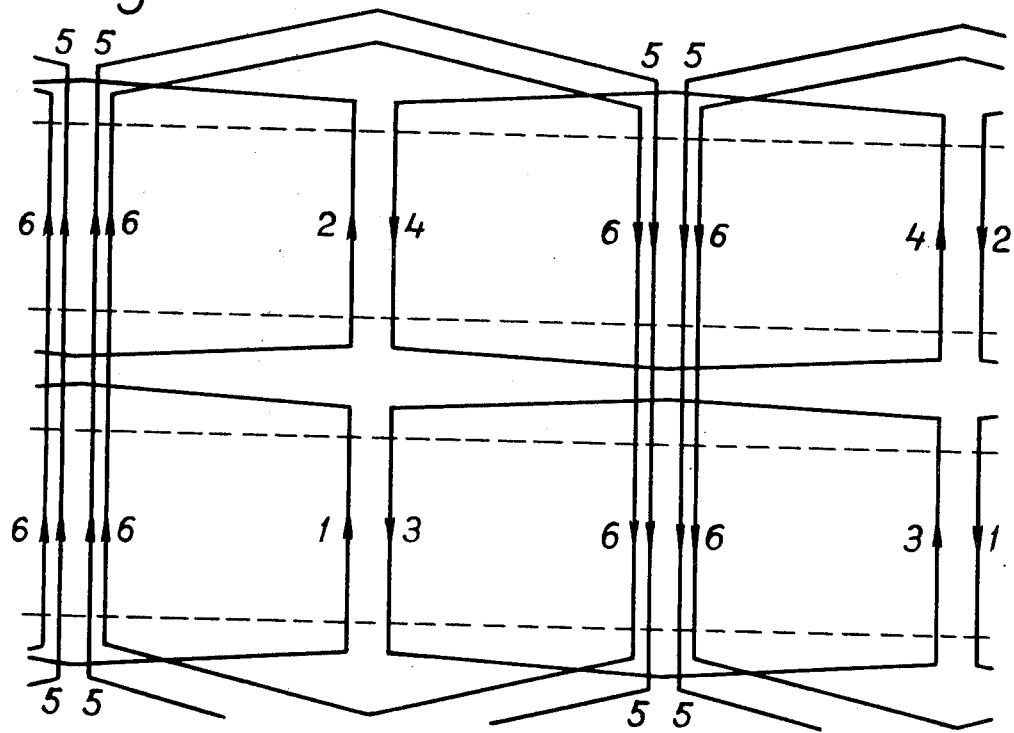
FIG. 5 shows the parts of the stator winding indicated in FIG. 4 seen in a direction towards the air gap surfaces of the stators of FIGS. 1 and 2.

In the drawings, 10 and 11 designate two equal, eight-pole, laminated stator cores with corresponding four-pole rotors 12 and 13, which are mechanically connected to each other. The stator poles are designated 8 and the rotor poles 9. If the two stators are arranged with the same angular position, the difference between the angular positions of the two rotors is 22.5°. As will be seen later on, this means that one rotor has its maximum instantaneous torque value when the other has its minimum instantaneous torque value. $\alpha = 22.5°$ is a theoretical optimum value, but the angle $\alpha$ between the two rotors may deviate considerably in relation to the optimum value without any appreciable harm being done. According to investigations made, $\alpha$ can often be allowed within the whole range $22.5° \pm 7.5°$. The stator pole pitch is designated $\tau_{pol_{stat}}$ and the rotor pole pitch $\tau_{pol_{rot}}$.

Each of the two stator cores 10 and 11 supports a stator winding, and these stator windings are mutually equal. The stator shown in FIG. 1 has a working winding which comprises four two-pole coils arranged one after the other in the peripheral direction, namely a pair of coils 1 arranged diametrically with respect to each other and another pair of mutually diametrically arranged coils 3. This is indicated in FIG. 15 where the arrows show the flux paths which may be obtained when the coils 3 and/or the coils 1 are current-carrying.

The term "two-pole coil" in the present application refers to a coil which is wound in such a way that each turn surrounds two stator poles arranged adjacent to each other in a tangential direction, and to a current circuit which is equivalent to a coil of said kind, for example two coils which are series-connected in a suitable manner, each of said coils surrounding one of two stator coils which are immediately adjacently positioned in a tangential direction.

Besides the individual working winding, constituted by the halves 101 and 103, the stator core 10 supports, together with the stator core 11, two magnetizing windings, one of which, 105, is intended to be connected to a constant voltage source 27, contains parallel- or series-connected two-pole coils 5. Each two-pole coil 5 is displaced by one pole pitch with respect to two-pole coils 1 or 3 of the working winding. The other of the two magnetizing windings is designated 106 and comprises four parallel or series-connected two-pole coils 6 which are arranged with exactly the same angular positions as the four coils 5.

FIG. 6 shows the directions of current in a reluctance-type motor arrangement which is composed of the two machines shown in FIGS. 1 and 2 and provided with rectifiers so that the current always has the direction shown by the arrows in FIG. 6.

In the arrangement shown in FIG. 7, the various windings of the machine shown in FIGS. 1, 2 and 3 are connected in accordance with the principle shown in FIG. 6, 14 being a controlled rectifier, the AC side of which is connected to an AC network 15. As already mentioned, the working winding positioned in the stator 10 has two winding halves 101 and 103 arranged on either side of a midpoint 7, said winding halves 101 and 103 being connected to a DC bar by means of one thyristor each, 16 and 18, respectively. Similarly, the winding halves 102 and 104 of the working winding positioned in the stator 11 are arranged on either side of a midpoint 17 and connected to the same DC terminal by means of one thyristor each, 19 and 20, respectively.

A position indicator, comprising a stator with two proximity switches of magnetic type 120 and 121, is coupled with the drive shaft of the reluctance motor and is arranged to emit a signal at various positions of the double rotor (12 + 13) in such a way that a rotation of the rotor of 45° mec takes place between each signal. The position indicator shown in FIG. 7, which is mechanically coupled to the rotor (12 + 13), comprises a four-pole rotor 21 and logic equipment 122. Because of the series-connected magnetizing winding 106, it is possible to let the circuits, in which the thyristors are included, work with self-commutation at full load with regard to temperature. If, for example, the thyristor 18 is ignited while current is flowing through the winding halves 101 and 102 and in a time interval when the voltage induced in the winding (101 + 103) and thus the commutating current circulating in the circuit (16 + 101 + 18 + 103) is of sufficient magnitude, this ignition will result in extinguishing the thyristor 16 so that the current is instead conducted through the thyristor 18. The commutating current must not, however, be too great when igniting the thyristor 18, and therefore an ignition pulse is only given at a position of the rotor when the commutating current has decreased to a value which is less than half the maximum value. In a similar way, the thyristor 20 takes over the current instead of the thyristor 19 when an ignition pulse is sent to the thyristor 20. The current progress in the winding halves 101, 102, 103 and 104 is clear from FIG. 14, where the corresponding current curves are designated $I_1$, $I_2$, $I_3$ and $I_4$. The current intensity is represented by ordinate values and the time is shown along the axis of abscissa.

In principle the number of ampere-turns given by the series winding in the pole gaps in which it is positioned should be the same as that given by the working winding pole gaps at the same current. In some cases, however, it may be an advantage if the series winding provides more ampere-turns than the working winding, since the excess number of ampere-turns (for example 10 – 20%) constitutes an addition to the number of ampere-turns produced by the separate magnetizing winding 105. In the following, this addition is referred to as "the premagnetization". It has the effect that the utilization of the machine can be increased without any increased power consumption for the premagnetization. In other cases, when the premagnetization is strong in relation to the ampere-turns of the working winding, it may be sufficient with a weaker series winding. However, under no circumstances must the series-winding be so weak that the sum of the ampere-turns of the series-winding and the premagnetization is less than the magnetomotive force of the working winding at the highest allowable machine current. This generally means that the series-winding should have a number of ampere-turns pole gaps which is not less than 50% of the number of ampere-turns pole gaps of the working winding.

Figure 9:
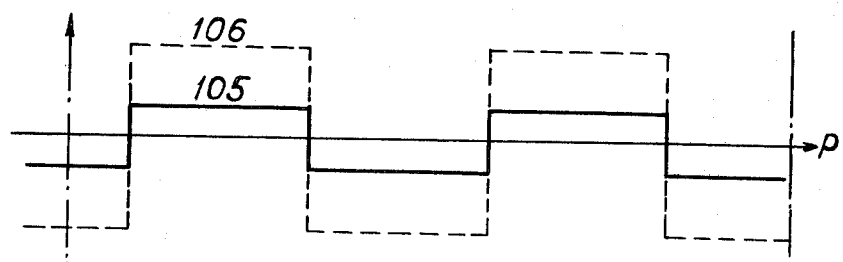
FIGS. 9, 10, 11 and 12 show how the magnetomotive force varies in the peripheral direction along an inner annular surface positioned in the air gaps.

In FIGS. 9 – 13 the stator periphery is disposed along the axis of abscissae and the magnetomotive force along the ordinate axis. The various M.M.F. curves are designated with the same numerals as the corresponding windings or parts of windings in the other drawings. In FIG. 9 the M.M.F. curve for the winding 5 is shown by broken lines and the M.M.F. curve for the winding 6 is shown by solid lines.

Figure 10:
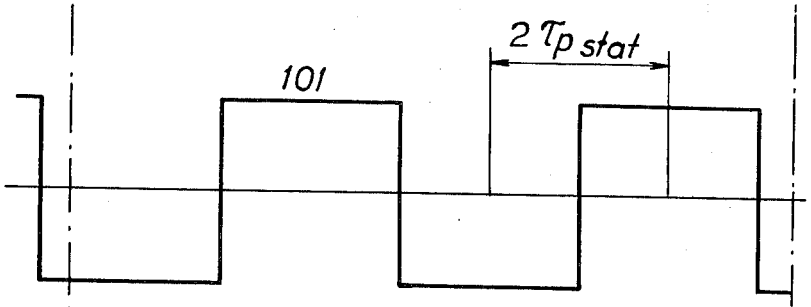
Figure 11:
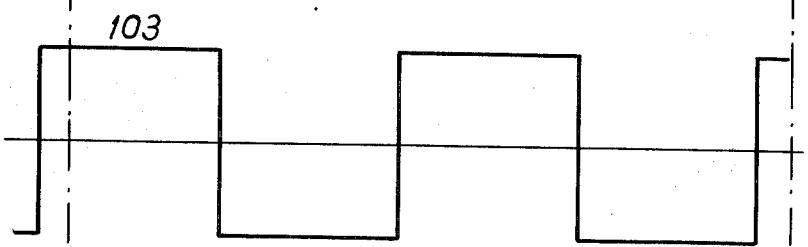
Figure 12:
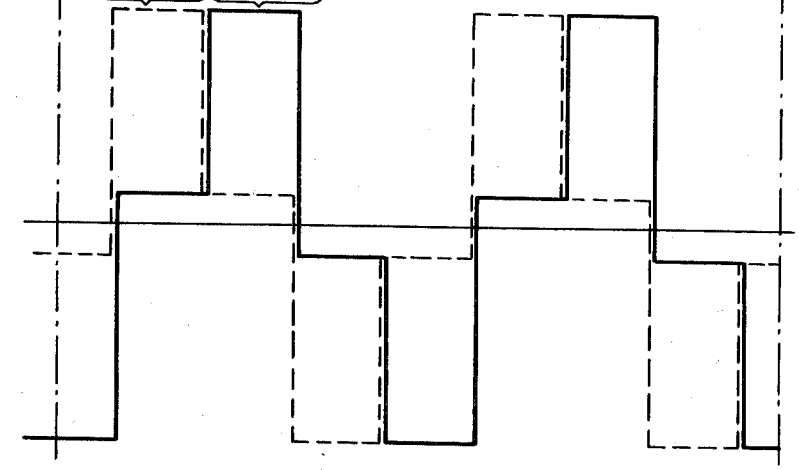
Figure 13:
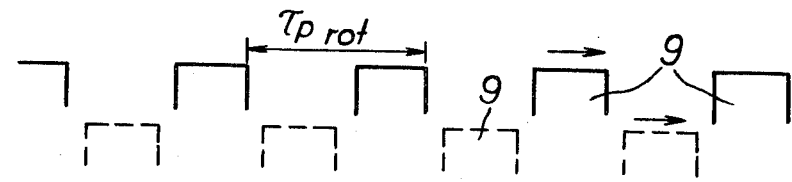
FIG. 13 shows the mutual tangential positions of the rotor poles of the two rotors included in the reluctance motor in the arrangement.

At any given time the working winding provides an M.M.F. either according to FIG. 10 or according to FIG. 11. By superposition, either the unbroken or the broken curve is obtained in FIG. 12. The full line poles 12 in FIG. 13 are in attracting position in relation to the unbroken M.M.F. curve in FIG. 12. After a rotor movement corresponding to a stator pole pitch, the poles of the rotor 12 will come into a position which corresponds to the broken line pole symbols in FIG. 13, that is in attracting position in relation to the broken line M.M.F. curve in FIG. 12.

When a reluctance machine arrangement according to the invention is constructed with two rotors, for example as shown in FIG. 7, a very even operation and a surprisingly low noise level is obtained. Even if only one rotor is used, an arrangement according to the invention is very advantageous in many respects, for example by the fact that a great efficiency is obtained with a simple and inexpensive convertor equipment. To a great extent the advantage can be attributed to the use of the magnetizing winding connected in series with the working winding and the particular manner of connecting said magnetizing winding, as a result of which its ampere-turns always have the same polarity, in spite of the fact that the M.M.F. of the working winding oscillates between plus and minus.

When a reluctance machine with one rotor and one stator only is used, an arrangement according to the invention can be achieved by removing components 102, 104, 19 and 20 in FIG. 7 and by connecting one end of the winding 106 direct to a DC bar. The coils 5 and 6 are given an axial dimension corresponding to the axial length of the stator core.

According to another embodiment of the invention, the reluctance motor can be constructed with a working winding which is not provided with a midpoint connection, and an arrangement according to FIG. 8 is used where the working winding of the reluctance machine is designated 22 and where 23, 24, 25 and 26 designate thyristors, whereas 105 and 106 refer to the same elements as in FIG. 7.

Instead of the arrangement shown in FIG. 15, the working winding of the stator core shown in FIG. 1 can be made as is illustrated in FIG. 16. (Only the working windings are shown.) When the thyristor 16 is conducting, current flows through the coils 1s which are series-connected or parallel-connected to each other in such a manner that the polarity of the poles corresponds to the North Pole (N) and South Pole (S) as shown in the drawing. When commutating from thyristor 16 to thyristor 18, the current in coils 1s disappears and instead flows in the mutually connected coils 3s, all the poles then reversing their polarities.

The coils 1s and 3s can be permanently series-connected to form two halves of working windings, 101 and 103 respectively, and two terminal points of the two series groups 101 and 103 may be permanently connected to each other, the connection points thus constituting a midpoint connection in the working winding.

A reluctance machine arrangement according to the invention is mainly intended to be used as a drive means and can be used with advantage when the required machine power is greater than 0.5 kW. It is particularly advantageous when the power is greater than 5 kW, for example when the power is of a magnitude of 300 kW.

Figure 17:
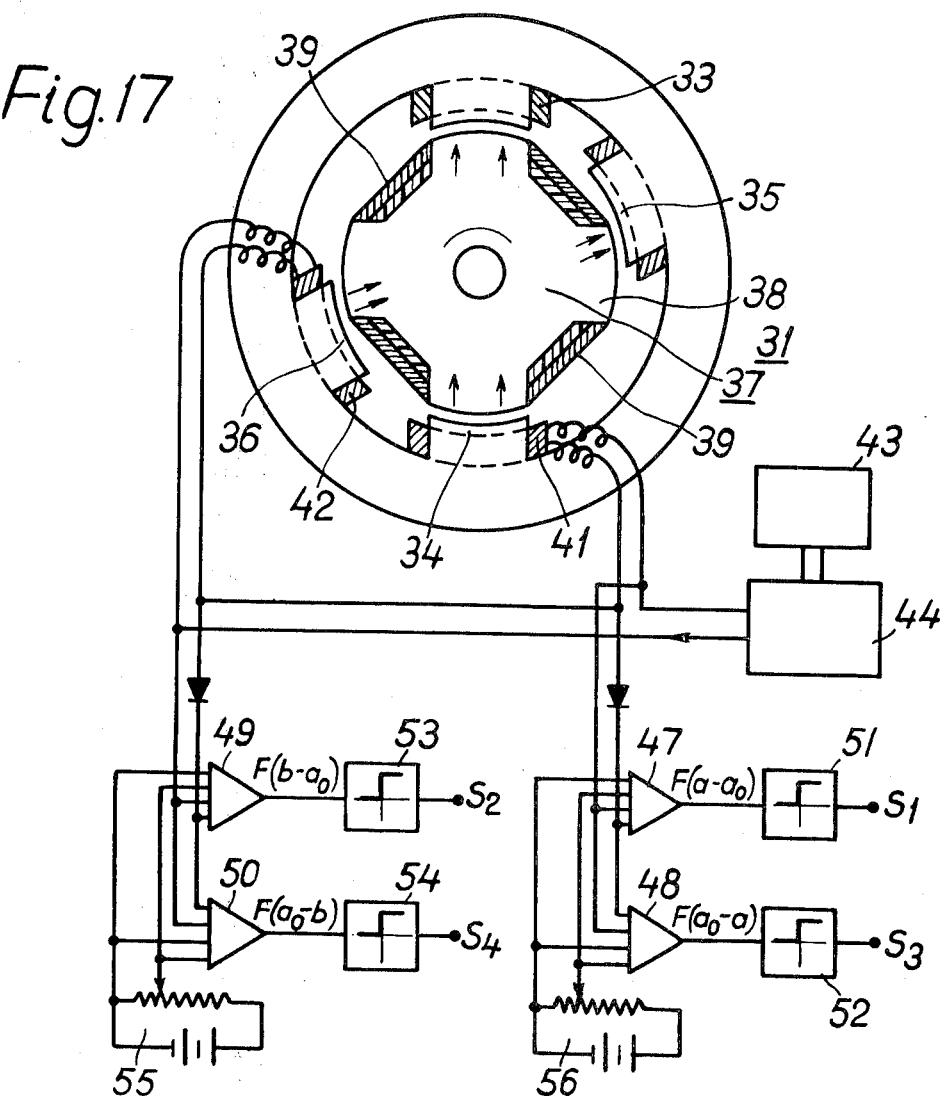
FIGS. 17 and 18 show an alternative embodiment of the invention and waveforms pertaining thereto.

In an arrangement according to FIG. 7, it is possible to use as an alternative the arrangement shown in FIG. 17 instead of the rotor 21, the transducers 120 and 121 and the logic equipment 122, the four terminals $S_1$, $S_2$, $S_3$ and $S_4$ then replacing the four output terminals shown in the logic equipment 122 in FIG. 7. An angular transducer according to the Swedish Pat. No. 372,858 is then used.

In FIG. 17, 31 designates a stator of laminated sheet material. The stator is designed with two pole pairs, one pole pair, the poles of which are designated 33 and 34, being displaced by half a pole width in relation to the pole pair 35,36. The stator 31 surrounds a four-pole laminated rotor 37 with rotor poles 38, the pole widths of which at the air gap are practically equal to the corresponding dimension of the stator pole.

Figure 18:
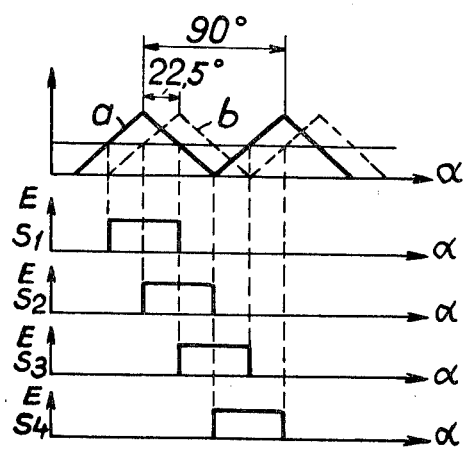

The pole gaps of the rotor have the same tangential dimension at the air gap as the rotor poles. Each pole gap is bridged by a plate 39 of electrically conducting material. The two pole pairs are each provided with a magnetizing winding in the form of the coils 41 and 42, respectively. The coils 41 and 42 are series-connected and connected to an AC source 43, which delivers a current with a constant current strength and with a frequency of 10,000 Hz by way of a constant current regulator 44. Because of the screening of the magnetic flux obtained by means of the plates 9, the flux of each pole pair is almost a linear function of the overlap between the stator and rotor poles. Each of the two pole systems is provided with a signal coil 45 and 46, respectively. The voltage induced in a signal coil is then proportional to the degree of overlap. In some cases a better adaptation to the amplifier and other parts can be obtained by not using the signal coils 45 and 46, and instead using the voltage drop across a magnetizing coil as an expression of the degree of overlap, which is done in FIG. 17. Since the current strength is constant in the magnetizing coils 41 and 42 and since the impedance of the coil increases with the degree of overlap, the voltage drop across such a coil will then be a substantially linear function of the degree of overlap. In FIG. 18 the curve a produces a voltage varying with the position of the rotor, which is supplied to the amplifiers 47 and 48 and emanates from the coil 41, and the curve b produces a voltage supplied to the amplifiers 49 and 50 and emanating from coil 42. By means of two mutually equal reference value transducers 55 and 56, the same reference value $a_0$ is set, which is supplied to the input side of all the amplifiers 47 – 50, in which the differences $b - a_0$, $a_0 - b$, $a - a_0$ and $a_0 - a$ are amplified, whereafter they are supplied to each of the bistable flip-flops 51 – 54, which operate according to the curve shown in each flip-flop symbol. FIG. 18 shows the voltage pulses which are obtained at the terminals $S_1$, $S_2$, $S_3$, $S_4$, that is the voltages on these terminals as functions of the angle of rotation $\alpha$ of the rotor. The pulse delivered from the terminal $S_1$ gives rise to the current $I_1$ shown in FIG. 14 which flows in the winding 101 in FIG. 7; the pulse from $S_2$ in FIG. 18 gives rise to the current $I_2$ through the winding 2, and so on.

The angular position of the rotor 38 in relation to the main rotor can be adjusted. Further, the flip-flops 51–54 can be adjusted so that the pulse is delivered at a difference value which differs somewhat from zero. In some cases it may be advantageous to provide the rectifier shown in FIG. 7 with a particular signal input, to which a control signal dependent on the rotor position is supplied in such a way that the current delivered by the current source 15 can be reduced while commutation from one winding to another is going on.

I claim:
1. Reluctance-type machine arrangement comprising a stator (10) with salient poles (8) and a rotor (12) with salient poles (9) surrounded by said stator, the number of stator poles being twice as great as the number of rotor poles, and the stator being provided with a working winding (101 + 103) and a first magnetizing winding (105) connected to a constant voltage source (27), each of said windings containing a plurality of two-pole coils (1, 3, 5) each of which surrounds two stator poles (8) located immediately one after the other in the peripheral direction, the two-pole coils (5) of said first magnetizing winding (105) being displaced by a stator pole pitch with respect to the two-pole coils (1, 3) of the working winding (101 + 103), a second magnetizing winding (106) for driving a flux along the same flux paths and with substantially the same distribution between the various flux paths as the flux driven by said first magnetizing winding (105), said second magnetizing winding (106) being series-connected to at least a part of the working winding (10 + 203) by means of controlled rectifiers (16, 18) in such a way that the polarity of the magnetomotive force of said second magnetizing winding is unaltered at varying polarities of the working winding (101 + 103).

2. Reluctance-type machine arrangement according to claim 1, in which the two ends of the working winding (22) are connected to the same end of said second magnetizing winding (106) by two controlled rectifiers (25, 26) and connected to the same point in a DC network by two controlled rectifiers (23, 24).

3. Reluctance-type machine arrangement according to claim 1, in which two ends of the working winding are each connected to one output terminal of a controlled DC source by a controlled rectifier (16, 18), the controlled rectifiers being similarly oriented with respect to said output terminal, and the working winding has a center tap (7) which is directly connected to said second magnetizing winding (106).

4. Reluctance-type machine arrangement according to claim 1, which comprises a reluctance machine having two stator cores (10, 11) arranged axially one after the other, two poles of one stator together with two axially and adjacently positioned poles of the other stator being provided with a common magnetizing coil (5, 6).

5. Reluctance-type machine arrangement according to claim 1, which comprises two stator cores (10, 11) arranged axially one after the other, and both stators having a common magnetizing winding (106), one end point of which is connected to a center tap (7) of the working winding (101 + 103) of one stator and the other end point of which is connected to a center tap (7) in the working winding (102 + 104) of the other stator.

6. Reluctance-type machine arrangement according to claim 1, in which the outer contour of the stator is substantially a square and all pole gaps positioned on diagonals of said square contain only coil sides belonging to said magnetizing windings.

* * * * *